United States Patent [19]

Russell

[11] Patent Number: 5,780,736

[45] Date of Patent: Jul. 14, 1998

[54] AXIAL THERMAL MASS FLOWMETER

[75] Inventor: Gary A. Russell, Pacific Grove, Calif.

[73] Assignee: Sierra Instruments, Inc., Monterey, Calif.

[21] Appl. No.: 757,934

[22] Filed: Nov. 27, 1996

[51] Int. Cl.[6] .................................................. G01F 1/68
[52] U.S. Cl. ........................... 73/204.11; 73/204.19; 73/204.23
[58] Field of Search .................... 73/204.11, 204.12, 73/204.13, 204.14, 204.15, 204.16, 204.17, 204.18, 204.19, 204.23, 204.25, 204.26

[56] References Cited

U.S. PATENT DOCUMENTS

| | | | |
|---|---|---|---|
| 3,148,541 | 9/1964 | Higgins | 73/204.23 |
| 3,733,897 | 5/1973 | Herzl | 73/204.23 |
| 3,798,967 | 3/1974 | Gieles et al. | 73/204.23 |
| 4,403,506 | 9/1983 | Lauterbach | 73/204.21 |
| 4,624,138 | 11/1986 | Ono et al. | 73/204.21 |
| 4,876,887 | 10/1989 | Mickler | 73/204.11 |

*Primary Examiner*—Richard Chilcot
*Assistant Examiner*—Max H. Noori
*Attorney, Agent, or Firm*—LaRiviere, Grubman & Payne

[57] ABSTRACT

Thermal mass flowmeter comprising a conduit defining a flow path and an elongated thermal mass flow sensor. The thermal mass flow sensor is coupled to the conduit with the longitudinal axis of the thermal mass flow sensor being aligned substantially parallel to the general direction of the fluid flow within the conduit. A method of measuring flowrates provides the same axial alignment of the thermal mass flow sensor.

2 Claims, 3 Drawing Sheets

AXIAL THERMAL MASS FLOWMETER

TECHNICAL FIELD

This invention relates to an improved thermal mass flowmeter, as well as a method of using thermal mass flowmeters, particularly in hostile environments where particulate deposition is otherwise a problem.

BACKGROUND OF THE INVENTION

A conventional thermal mass flowmeter 10 is shown in FIG. 1. The flowmeter 10 comprises a thermal mass flow sensor 12 that monitors the mass flowrate of a fluid flow, and a temperature sensor 14 that monitors the fluid's temperature. The sensors 12, 14 are mounted in a probe shaft 16, and sensor wires 28 lead from the flowmeter to an analog or digital sensor drive. The sensors 12, 14 typically include a resistance temperature device whereby a temperature output is available from each sensor 12,14.

In use, the flowmeter 10 is immersed in a fluid flow which passes 15 transversely over the sensors 12, 14. The thermal mass flow sensor 12 is heated to a temperature above the flow temperature, either by a current passed directly through its resistance temperature device, or by means of a separate heating element.

The sensor drive electronics normally operates the thermal mass flow meter either in a "constant-temperature" mode in which the electronics maintains constant the temperature differential between the thermal mass flow sensor 12 and the temperature sensor 14, or in a "constant-power" mode in which the electronics maintains constant the electrical power used to heat the thermal mass flow sensor 12.

In the constant temperature mode, the electrical power needed to maintain the temperature differential between the sensors 12,14 is related to the mass flowrate in a known manner, while in the constant power mode, the temperature differential resulting from the constant power supplied to the mass flow sensor 12 is related to the mass flowrate in a known manner.

Thus, the heat transfer between the thermal mass flow sensor and the fluid flow is the parameter which is used to determine the fluid flowrate, and anything which affects this heat transfer will have a corresponding effect on the output of the thermal mass flow meter.

In certain applications of thermal mass flowmeters, for example in power station coal fired gas stacks, particles entrained in the gas flow can deposit on the sensors 12 and 14. While this was previously believed not to effect the operation of the thermal mass flowmeter, Applicant has determined that such particle deposition can result in serious degradation of the accuracy of a thermal mass flowmeter operating in such an environment.

Also, where the thermal mass flowmeter is used in a conduit where the temperature of the fluid flow differs substantially from the conduit wall or other mounting to which the thermal mass flow meter is mounted, heat transfer between the conduit wall and the thermal mass flow sensor can cause inaccuracies in the temperatures measured by the sensors 12 and 14.

Accordingly, there is a need for a thermal mass flowmeter and method of using a thermal mass flowmeter which is less sensitive to particle deposition, and is less sensitive to temperature differences between the fluid flow and the surrounding equipment.

SUMMARY OF THE INVENTION

For a better understanding of the advances made the invention, reference is now made to FIG. 2 which illustrates an end view of three thermal mass flow sensors 22, 24 and 26 positioned in a transverse fluid flow 28.

The thermal mass flow sensor 22 illustrates the flow around the sensor 22 under normal operating conditions in an environment where particulate deposition is not a problem. The flow 28 passes around the sensor 22, and vortices 30 form at the rear side of the sensor 22. Heat is transferred convectively away from the sensor 22 by the flow 28.

The thermal mass flow sensor 24 illustrates the conventional misunderstandings regarding the effects of particulate deposition on a thermal mass flow sensor. In this figure, particles have deposited on the sensor 24 to form a substantially cylindrical particulate buildup 32.

This particulate buildup 32 typically does not function either as a thermal insulator, nor does it function as a thermal conductor to draw heat conductively away from the sensor in any manner different from before. In other words, the thermal conductivity of the sensor 24 remains essentially unchanged by the buildup 32, and accordingly the heat flow from the sensor, and hence the flowrate readings will be substantially unchanged.

As before, the flow 28 passes around the sensor 24, and vortices 34 form at the rear side of the sensor 24.

Applicant however has determined that, contrary to conventional wisdom, particulate buildup does degrade the accuracy of flowrate outputs available from thermal mass flowmeters, and that the root of the problem is not an alteration of the thermal conductivity of the sensor by the buildup, but rather that the buildup alters the thermal convection characteristics of the sensor.

This situation is illustrated by the thermal mass flow sensor 26 in FIG. 2. In this Figure, particulate buildup 36 is seen to be taking place on the trailing edge of the thermal mass flow sensor 26. This buildup is caused by the vortices 30 which are generated behind the clean sensor when it is first inserted into the particulate flow. Particles entrained in the fluid flow enter this vortex system behind the sensor 26, where they impact and remain attached to the sensor 26. Over a short period of time, the particles accumulate to form the buildup 36. This buildup 36 transforms the shape of the sensor from a cylinder to a more streamlined wing shape as shown. This in turn alters the nature of the flow around the sensor 26, and in particular, the initial vortex system 30 at the trailing edge is found to be no longer present.

This vortex system 30 was originally responsible for creating a large proportion of the heat transfer occurring between the sensor 26 and the flow 28. By reducing the turbulence around the sensor 26, the convective heat transfer is substantially altered, with a corresponding degradation in the flowrate readings obtained from the thermal mass flowmeter.

The exact nature of the particulate buildup occurring on the thermal mass flow sensor depends on a number of factors including the adhesive quality or "stickiness" of the particles, the composition of the particles, the velocity of the flow and hence the speed of the particles.

Under some circumstances, no buildup may occur, while in other circumstances, the particles may adhere to the leading edge of the sensor. In the case where the particles adhere to the leading edge of the sensor, a streamlining effect is also found causes a corresponding degradation in the flowrate reading obtained from the thermal mass flowmeter.

To overcome this problem, the current invention provides a thermal mass flow meter wherein an elongated thermal mass flow sensor is axially aligned with the fluid flow. Under such conditions, the component of the flow normal to the wall of the sensor is small, which reduces the particle impact energy to nearly zero along the walls of the sensor. This substantially eliminates the buildup of particles on the sensor walls, and the convective interaction between the sensor and the fluid flow therefor remains substantially unchanged.

The only affected impact area of the sensor in this configuration is the tip which faces into to fluid flow. In use, a conical or rounded particulate buildup forms on the tip within a relatively short time, and any effects of this buildup on the convective heat transfer, which are small to begin with, stabilize and remain constant from then on.

To anticipate this buildup, the thermal mass flow sensor may be provided with a conical or rounded tip.

More particularly, according to the invention there is provided a thermal mass flow meter comprising:

a conduit defining a fluid flow path having a general direction along which fluid flows in use;

an elongated thermal mass flow sensor having a longitudinal axis, the thermal mass flow sensor being coupled to the conduit with the longitudinal axis of the thermal mass flow sensor being aligned substantially parallel with the general direction of flow; and a temperature sensor mounted in the conduit for providing an output of the temperature of the fluid flow in use.

Also according to the invention there is provided a method of determining the mass flowrate of a fluid flow comprising the steps of:

providing an elongated thermal mass flow sensor having a longitudinal axis;

mounting the thermal mass flow sensor in the fluid flow with the longitudinal axis of the thermal mass flow sensor substantially aligned with the general direction of the fluid flow; and operating the thermal mass flow sensor under the control of processing means for obtaining a measurement of the fluid flowrate.

Other features of the present invention are disclosed or apparent in the section entitled: "BEST MODE FOR CARRYING OUT THE INVENTION."

BRIEF DESCRIPTION OF THE DRAWINGS

For fuller understanding of the present invention, reference is made to the accompanying drawings in the following detailed description of the Best Mode of Carrying Out the Present Invention. In the drawings.

BEST MODES FOR CARRYING OUT THE INVENTION

As thermal mass flowmeters are well-known in the art, in order to avoid confusion while enabling those skilled in the art to practice the claimed invention, this specification omits many details with respect to known items.

Figure 1:
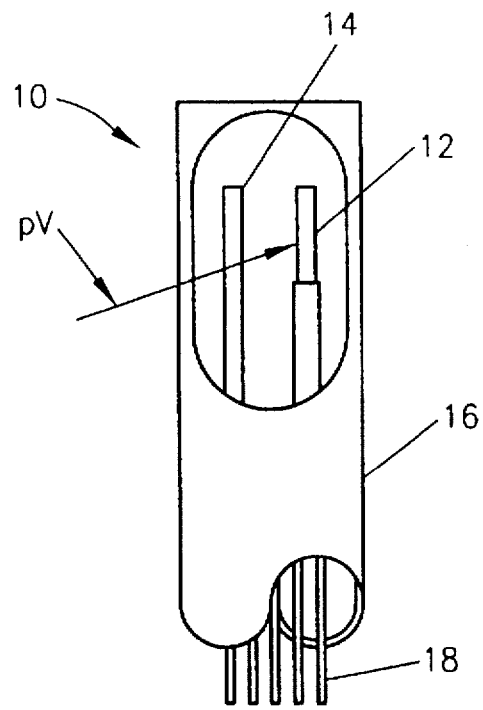
FIG. 1 is a side view of a prior art transverse flow thermal mass flowmeter.
Figure 4:
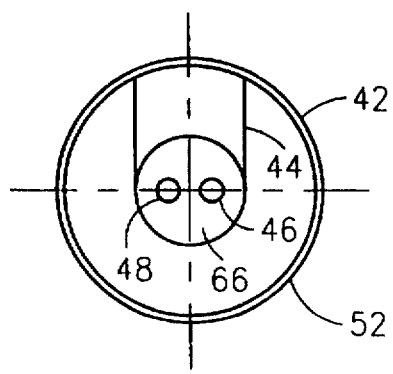
FIG. 4 is a simplified transverse cross sectional view of the in-line thermal mass flow meter of FIG. 4, taken upstream of the sensor pair.
Figure 2:
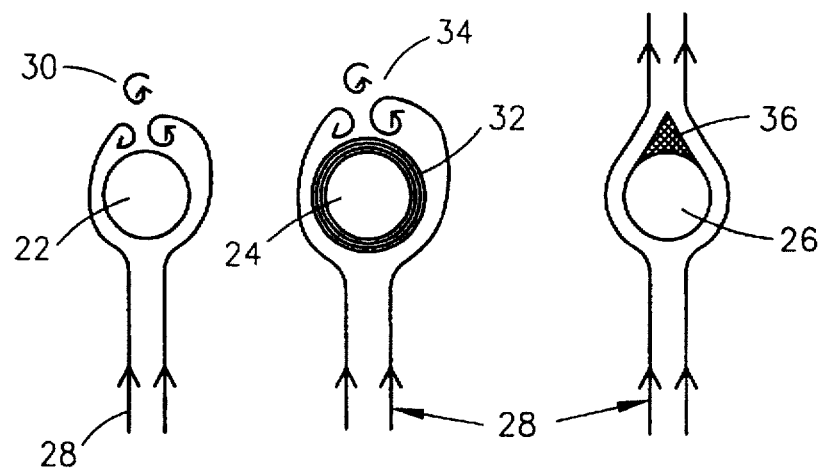
FIG. 2 is an end view of three thermal mass flow sensors positioned in a transverse fluid flow.
Figure 3:
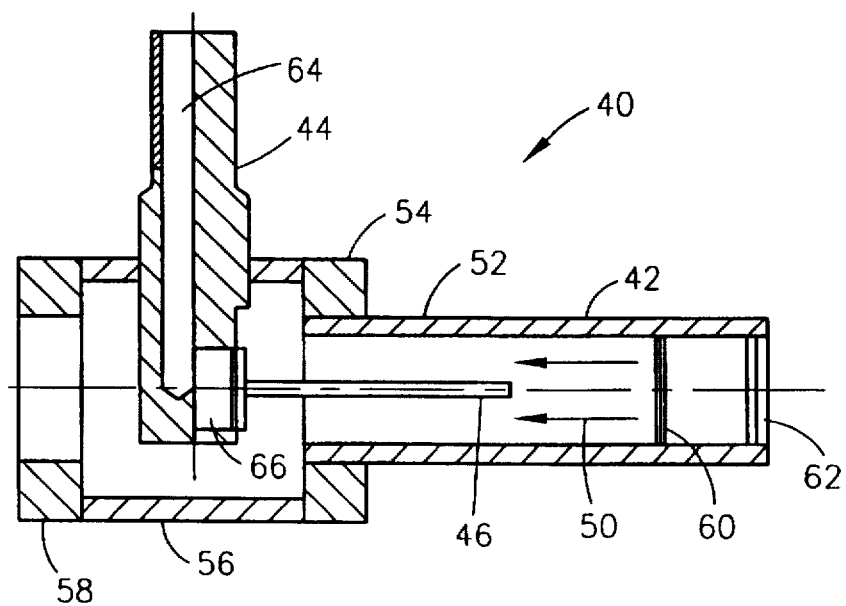
FIG. 3 is a longitudinal cross sectional view of the best mode in-line thermal mass flow meter according to the invention.

Referring now to FIG. 3, the best mode in-line thermal mass flowmeter 40 comprises a conduit 42 defining a fluid flow path, a probe body 44 and a thermal mass flow sensor 46. Located next to the thermal mass flow sensor 46 is a temperature sensor 48. This can be seen more clearly in FIG. 4 which shows a schematic transverse cross section of the flowmeter 40 taken just upstream of the sensor pair 46, 48. For purposes of clarity, many of the features of the flowmeter 40 have been omitted from schematic FIG. 4.

The conduit 42 comprises a series of tubular sections 52, 54, 56 and 58 of varying diameter, and located upstream of the sensors 46, 48 are two conventional flow conditioners 60 and 62.

The probe body 44 serves to position the sensor pair at substantially the center of the flow stream 50. The probe body 44 has a bore 64 defined therein which provides a route for the sensor wires (not shown) leading from the sensors 46, 48 to exit the thermal mass flow sensor 40.

The thermal mass flow sensor 46 and the temperature sensor 48 are mounted to the probe body 44 by means of a sensor plug 66.

The elongated thermal mass flow sensor 46 and elongated temperature sensor 48 are aligned with their longitudinal axes substantially parallel to the general direction of flow 50 in use.

In the preferred operation of either of the two embodiments of the invention disclosed herein, the sensors are aligned within ±5° of the direction of the fluid flow, but applicants believe that the alignment of the sensors can be within about ±20° of the direction of the fluid flow and still retain advantages associated with the invention. The phrase "substantially parallel" should be interpreted accordingly.

This alignment has two advantages, firstly, less particulate deposition on the walls of the sensors 46, 48 as described above, and secondly, the heat transfer between the sensors 46, 48 and the fluid flow is less affected by any temperature differences between the fluid flow and the conduit 42 or probe body 44.

The thermal mass flow sensor 44 is conventional in structure, and may for example be a Sierra Instruments, Inc model no. 43-0121-01-1 resistance temperature device sensor. The temperature sensor is also conventional in structure and may for example be a Sierra Instruments, Inc model no. 43-0120-01-1 temperature sensor.

In use, the thermal mass flow meter 40 is placed into a fluid line such that the conduit 42 replaces a section of the fluid line, in what is known in the art as an in-line arrangement. After calibration using conventional techniques, the thermal mass flow sensor 46 and temperature sensor are operated in a conventional manner well known in the art, using conventional sensor drive electronics, such as Sierra Instruments, Inc. model no. 640.

Figure 5:
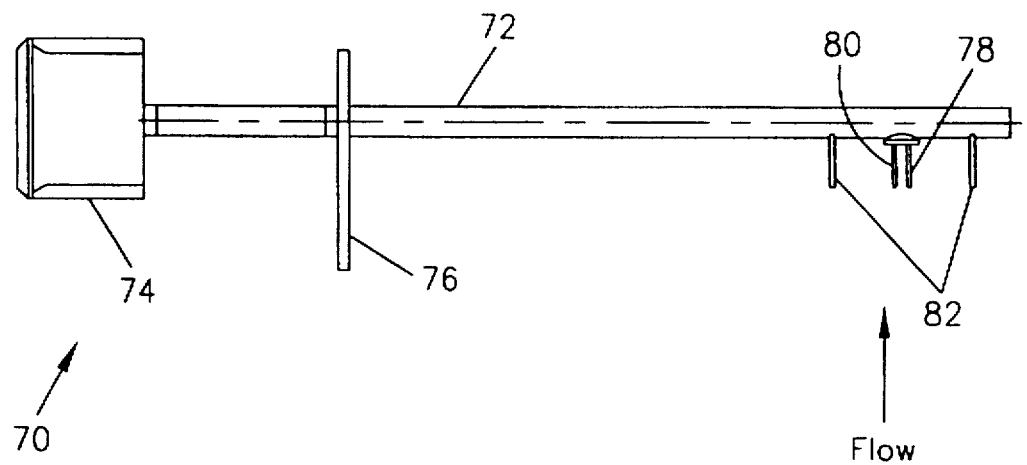
FIG. 5 is a top view of the best mode insertion thermal mass flow meter according to the invention.

FIG. 5 illustrates the best mode insertion thermal mass flowmeter 70, which is particularly suited for use in large diameter flow passages such as power station stacks.

The flowmeter 70 comprises a probe body 72, a junction box 74, a flange 76, a thermal mass flow sensor 78 and a temperature sensor 80.

The elongated sensors 78, 80 project transversely from the probe body 72, and their longitudinal axes are aligned in use substantially parallel to the general direction of flow as shown. Located on either side of the sensor pair 78, 80 is a guard 82. The guards 82 serve to protect the sensors 78, 80 from damage during handling of the flowmeter 70.

The probe body 70 serves to position the sensors 78, 80 at a desired location in a flow passage. The flowmeter 70 is mounted to the wall of the flow passage by means of the flange 76, after the flowmeter has been inserted through an aperture in the flow passage. Sensor wiring passes from the sensors 78, 80 through the probe body 72 and to the junction box 74 where the wires are connected to terminals which are available to lead the sensor outputs to a sensor drive.

As in the previous embodiment, the thermal mass flow sensor 78 and the temperature sensor 80 are conventional in structure and may for example be Sierra Instruments Inc. model nos. 43-0121-01-1 and 43-0120-01-1 respectively. In use, the flowmeter 70 is mounted to a flow passage wall such that the thermal mass flow sensor 78 is positioned in the fluid flow with the longitudinal axis of the thermal mass flow sensor aligned substantially parallel to the general direction of the fluid flow, and the thermal mass flow sensor 78 is operated under the control of conventional sensor drive electronics for obtaining a measurement of the fluid flowrate.

It will be appreciated that the invention is not limited to the embodiment of the invention described above, and many modifications are possible without departing from the spirit and the scope of the invention.

What is claimed is:

1. A thermal mass flow meter comprising:

a conduit defining a fluid flow path having a general direction along which fluid flows in use:

an elongated thermal mass flow sensor having a longitudinal axis, the thermal mass flow sensor being coupled to the conduit with the longitudinal axis of the thermal mass flow sensor aligned substantially parallel to the general direction of fluid flow within the conduit for reducing the sensitivity of the mass flow sensor to external temperature differences or for reducing particle buildup along the length of the mass flow sensor thereby to maintain the convection interaction between the fluid flow and the mass flow sensor essentially unchanged; and an elongated temperature sensor mounted in the conduit adjacent to the thermal mass flow sensor, for providing an output of the temperature of the fluid flow in use, the temperature sensor having a longitudinal axis, the longitudinal axis of the temperature sensor being substantially aligned with the general direction of the fluid flow for reducing the sensitivity of the temperature sensor to external temperature differences or for reducing particle buildup along the length of the temperature sensor thereby to maintain the convection interaction between the fluid flow and the temperature sensor essentially unchanged.

2. A method of determining the mass flowrate of a fluid flow comprising the steps of:

providing an elongated thermal mass flow sensor having a longitudinal axis and an elongated temperature sensor having a longitudinal axis;

mounting the thermal mass flow sensor and the temperature sensor in the fluid flow with the longitudinal axis of the thermal mass flow sensor and the longitudinal axis of the temperature sensor substantially aligned with the general direction of the fluid flow for reducing the sensitivities of the mass flow sensor and the temperature sensor to external temperature differences or for reducing particle buildup along the lengths of the mass flow sensor and the temperature sensor thereby to maintain the convection interactions between the fluid flow and the mass flow sensor and temperature sensor essentially unchanged; and operating the thermal mass flow sensor and the temperature sensor under the control of processing means for obtaining a measurement of the fluid flowrate.

* * * * *